(12) United States Patent
Saloni et al.

(10) Patent No.: US 12,317,177 B2
(45) Date of Patent: May 27, 2025

(54) SEAMLESS REGULATORY ACCESS POINT UPDATES ENSURING CONTINUAL CLIENT CONNECTIVITY

(71) Applicant: HEWLETT PACKARD ENTERPRISE DEVELOPMENT LP, Houston, TX (US)

(72) Inventors: Shubham Saloni, Santa Clara, CA (US); Qiang Zhou, Santa Clara, CA (US); Nethra Muniyappa, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 361 days.

(21) Appl. No.: 17/876,428

(22) Filed: Jul. 28, 2022

(65) Prior Publication Data
US 2024/0040488 A1 Feb. 1, 2024

(51) Int. Cl.
*H04W 48/16* (2009.01)
(52) U.S. Cl.
CPC .................................. *H04W 48/16* (2013.01)
(58) Field of Classification Search
None
See application file for complete search history.

(56) References Cited

U.S. PATENT DOCUMENTS

| | | | |
|---|---|---|---|
| 8,391,904 B2 | 3/2013 | Hillan et al. | |
| 10,219,182 B1 | 2/2019 | Hahn et al. | |
| 2010/0214958 A1 | 8/2010 | Wijayanathan et al. | |
| 2011/0111780 A1* | 5/2011 | Hillan | H04W 28/24 455/507 |
| 2011/0319088 A1* | 12/2011 | Zhou | H04B 17/345 455/442 |
| 2021/0409957 A1 | 12/2021 | Changlani et al. | |
| 2021/0409961 A1 | 12/2021 | Changlani et al. | |

FOREIGN PATENT DOCUMENTS

EP 2434811 A2 3/2012

* cited by examiner

*Primary Examiner* — Minh Trang T Nguyen
(74) *Attorney, Agent, or Firm* — Sheppard Mullin Richter & Hampton LLP

(57) ABSTRACT

Systems and methods are provided for ensuring client device connectivity in a deployment pursuant to regulatory updates impacting channel usage or availability. An access point (AP) or AP controller may obtain a client-supported channel list, and detect existence of a regulatory update impacting channel usage in the network device. An AP-supported channel list is compared to the client-supported channel list, and a determination is made regarding which client devices associated to an AP do not support channel usage changes resulting from the regulatory update. Distribution of channels of the AP-supported channel list is controlled among one or more radios of APs in a deployment based on AP density of the deployment, and the determination regarding which client devices do not support the channel usage changes.

20 Claims, 6 Drawing Sheets

Computing Component 300

Hardware Processor 302

Machine-Readable Storage Medium 304

Obtain client-supported channel list
306

Detect existence of regulatory update impacting channel usage
308

Compare AP-supported channel list to the client-supported channel list and determine which clients associated to the AP do not support channel usage changes resulting from the regulatory update
310

Distribute channels of the AP-supported channel list among one or more radios of APs in a deployment based on AP density of the deployment and the determination regarding which clients do not support the channel usage changes
312

FIG. 3

SEAMLESS REGULATORY ACCESS POINT UPDATES ENSURING CONTINUAL CLIENT CONNECTIVITY

BACKGROUND

Wireless local area network (WLAN) infrastructure elements or components in a Wi-Fi® network provide service to WLAN devices. In particular, networks usually have one or more controllers, each controller supporting a plurality of access points (AP) deployed within or throughout some area or enterprise. Wi-Fi® networks operating in accordance with IEEE 802.11 standards are examples of such networks. Wireless network communications devices (also referred to as stations or client devices), such as personal computers and mobile phones transmit data across wireless digital networks vis-à-vis Wi-Fi® APs, and cellular network APs, for example.

Wireless communications occur over the radio spectrum, a part of the electromagnetic spectrum with frequencies from 0 Hz to 3 THz. To prevent interference between different users, systems, networks, etc., the generation and transmission of radio frequency signals is regulated, typically by national regulations/laws, which in turn, are coordinated by the International Telecommunication union (ITU). The ITU allocates different parts of the radio spectrum for use in different industries or technologies, e.g., broadcast television stations, cellular communications operators, and so on.

When changes to regulations occur, network elements like APs need to be updated to comply with such changes. For example, regulations may change regarding what portion of the radio spectrum is available for use, perhaps allowing Wi-Fi® APs to operate over a new portion of the radio spectrum that was previously restricted from use. Typically, each regulatory change needs to be implemented or carried out, e.g., by distributing appropriate upgrade data/information/configuration to customers using software upgrades. However, this manner of handling regulatory changes can be cumbersome in that each regulatory change needs to be patched into multiple maintenance releases.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 is a block diagram of an example computing component or device for maintaining client connectivity pursuant to regulatory changes in accordance with one example of the disclosed technology.

Figure 1:
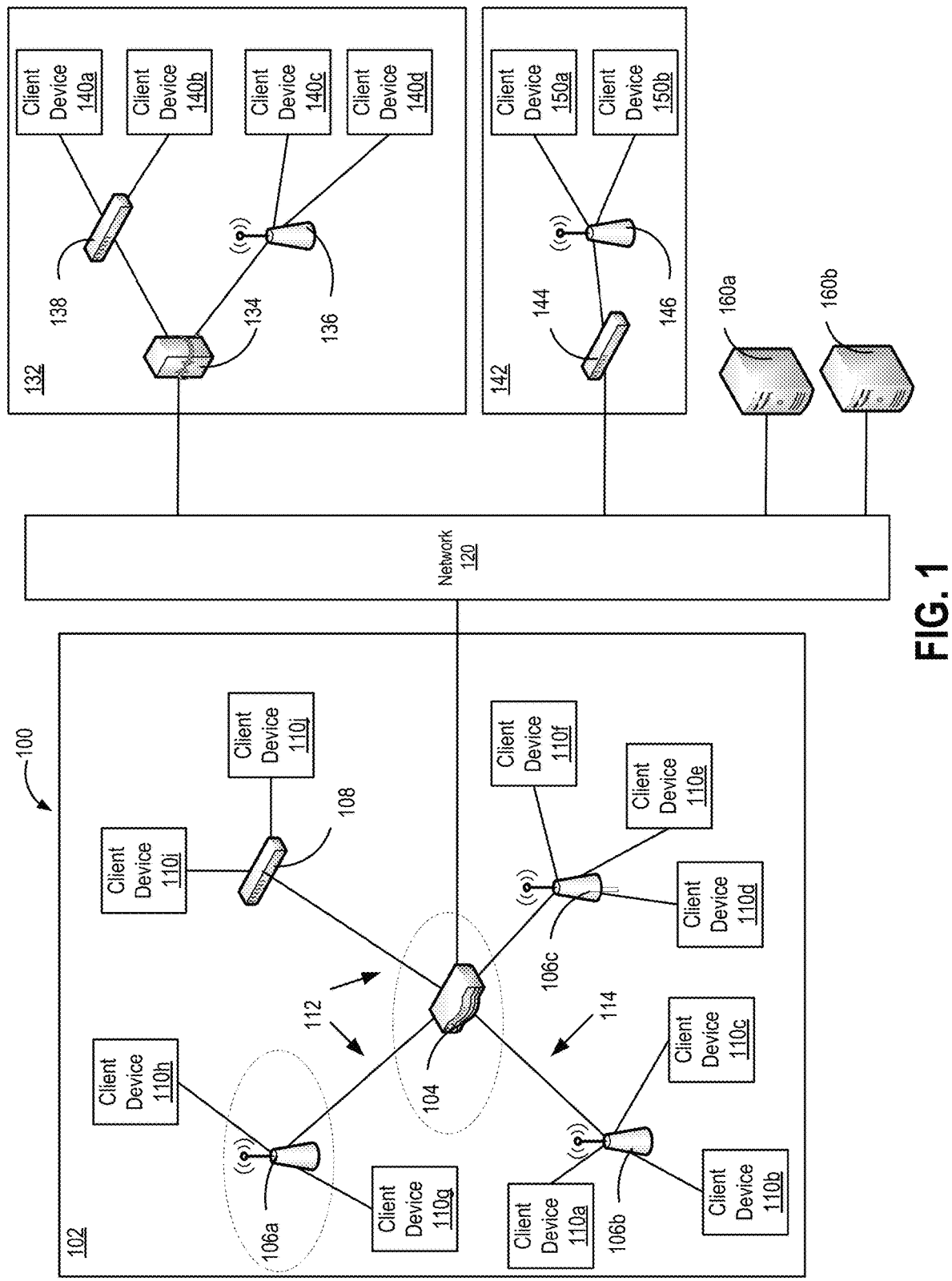
FIG. 1 illustrates one example of a network configuration in which examples of the disclosed technology may be implemented.

The figures are not exhaustive and do not limit the present disclosure to the precise form disclosed.

DETAILED DESCRIPTION

As alluded to above, APs may require upgrading due to regulatory changes. Such upgrades may entail updating an AP's regulatory data/information, e.g., an AP's regulatory file. In some systems/networks, a feature is provided where such regulatory information can be distributed in a separate file that can be downloaded onto a controller, such as an AP controller (or other centrally-managed logic running on a hardware-based/virtual device) or onto an AP itself without necessitating an upgrade to the AP's software/software version. That is, when a regulatory change occurs, relevant information can be encapsulated in a file for distribution. This file, which can be referred to as a Regulatory-Cert, may contain AP regulatory information, and can be released periodically, for example, on a customer's support site. The Regulatory-Cert file can then be uploaded directly to APs or uploaded to an AP controller(s), and then pushed to deployed APs.

Although APs may be readily upgraded (as discussed above), those client devices (also referred to as clients or stations (STAs)) associated to such APs are not as easily configured (or reconfigured) to operate in accordance with a regulatory change(s). For example, different Wi-Fi® chip vendors may release proprietary software drivers that can be used by client devices. Such client devices may also be operated or managed by different entities. For example, some client devices may be personal devices, some client devices may be managed by different corporate entities, and so on.

Accordingly, adapting to regulatory changes can be difficult for conventional technologies from the client device perspective. If client devices cannot be upgraded or configured/reconfigured to accommodate any new regulatory changes, e.g., the addition of channels in a particular portion of the radio spectrum that have become available for use, such client devices will be unable to find any useable APs if APs have been upgraded/reconfigured in accordance with the new regulatory changes. That is, client devices that may support the new regulatory changes (e.g., can support newly added channels) can co-exist with clients that cannot (or may not yet) support the new regulatory changes.

Thus, examples of the disclosed technologies are directed to computer-implemented solutions to technical problems involving coverage or service holes in a wireless communications network or deployment. If, based on a comparison between channels supported by an AP (more particularly, one or more radios of the AP) and channels supported by client devices results in a determination that some AP-supported channels are not supported by client devices, those unsupported channels are selectively deployed. That is, new channels are deployed (the new channels resulting from a regulatory update or change) only when a large enough (threshold) number of client devices are present and associated to an AP, and can support the new channels.

Because client devices capable of supporting new channels and client devices incapable of supporting new channels may co-exist within the same network or deployment, or may be associated to the same or neighboring APs, the selective deployment of channels is based on AP density. As used herein, the term AP density can generally refer to the number of APs in a given area, and more particularly, to a metric that is indicative of or reflects the number of APs that are able to hear one another, e.g., can receive beacons or other signals transmitted by another AP, typically a neighboring AP. If the density of APs in a particular network or deployment is neither too high nor too low, channels are distributed amongst the radios of APs in a network or deployment equally (both the old and new channels). In this way, there are enough radios that support both old and new channels resulting from a regulatory update for corresponding client devices. If the density of APs is low (relative to a minimum threshold), however, only those channels existing prior to the regulatory update may be deployed. If, on the other hand, the density of APs in a particular network or deployment is high (relative to a maximum threshold), both old and new channels are distributed as function of the number (or percentage) of client devices that cannot support the new channels. In this way, the operation of a network or AP deployments within one or more networks can be optimized in accordance with the capabilities of client devices using APs in the network/deployment.

Recently developed access points (APs) may comprise multi-band radios, such as dual-band simultaneous radios that can operate with, e.g., eight radio chains in the 5 GHz band and four radio chains in the 2.4 GHz band. At runtime, the 5 GHz radio can be converted into two logical radios each operating with four radio chains, for example. Channel switching can be prompted by, e.g., detection of radar or when channel utilization is beyond acceptable limits, or as alluded to above, in response to some regulatory change(s) affecting channel usage or allocation. When a channel switch has been initiated, an AP's radio can transmit a channel switch announcement information element (CSA IE) in its beacons and then transition to that new channel. If, for some reason, the AP's radio cannot transition to the new channel, e.g., radar is detected during a channel availability check (CAC)-compliant scan time, the radio can abandon the scan on the channel and may scan another channel. It should be noted that examples disclosed in the present disclosure are not necessarily limited to multi-radio modes such as 7+1 or 4+3+1 modes. For example, some contemplated embodiments may comprise isolating more than a single radio chain, where the multiple isolated radio chains may be set to operate on the same channel. In general, a radio can be split into any number of radio chains that in sum, equal that of the original radio.

Also, certain APs can be converted or configured to operate according to dual- or tri-radio modes. For example, an AP may be configured to operate using logical or physical radios. e.g., a 2.4 GHz radio and two 5 GHz radios. That is, a network device, such as an AP can use a radio chain to transmit and/or receive information via a network. As used herein, the term "radio chain" can refer to hardware that can transmit and/or receive information via radio signals. Wireless client devices and/or other wireless devices can communicate with a network device on a communication channel using multiple radio chains. As used herein, the term "communication channel" (or channel) can refer to a frequency or frequency range utilized by a network device to communicate (e.g., transmit and/or receive) information. A multiple input multiple output (MIMO) network device can use multiple radio chains to transmit and/or receive information. A radio chain can include two antennas such as a horizontal antenna and a vertical antenna, among other possibilities. As used herein, the term "antenna" refers to a device that converts electric power into radio waves, and/or vice versa.

It should be noted that according to the 802.11 standard, a service set or extended service set (ESS) can refer to a group of wireless network devices that are identified by the same service set identifier (SSID) or "network name." A basic service set (BSS) can refer to a subgroup of devices with a service set that (in addition to operating on the same level 2 networking parameters to form a logical network) operate within the same physical layer medium access characteristics, e.g., RF, modulation scheme, security settings, etc. such that they are wirelessly networked. Thus, in an enterprise WLAN network, multiple BSSs can be controlled such that network devices can be clustered in different BSS networks.

By selectively distributing channels, interruptions to, or service disruptions in client device connectivity pursuant to regulatory updates being promulgated to a network/deployment can be mitigated or avoided altogether. It should be understood that BSS operations can encompass transmissions/reception of data and non-data frames between an AP and its clients performed using the radio chain(s) on the AP and client.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing embodiments of the disclosed systems and methods in detail, it is useful to describe an example network installation with which these systems and methods might be implemented in various applications. FIG. 1 illustrates one example of a network configuration or deployment 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. Although some examples described herein may be specific to an AP controller, generally, a controller may be any sort of centrally-managed logic running on hardware based or virtual device. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point. As will be discussed in greater detail below, a controller, such as controller 104 may be configured to assess AP density and perform channel allocation or distribution/deployment based on client device capabilities in a network or deployment such as primary site 102, for example. In other examples, APs themselves, e.g., APs 106a, 106b, and 106c, may make AP density assessments, determine client channel capabilities, and deploy channels as appropriate. Again, the AP density metric in a network or deployment may be used as a basis for selectively deploying channels and distributing channel usage across one or more AP radios. Alternatively, APs can perform the same/similar functions to determine AP density, client device channel capabilities, and to manage channel distribution amongst AP radios.

The controller 104 may be in communication with one or more switches 108 and/or wireless APs 106a-c. Switches 108 and APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2A:
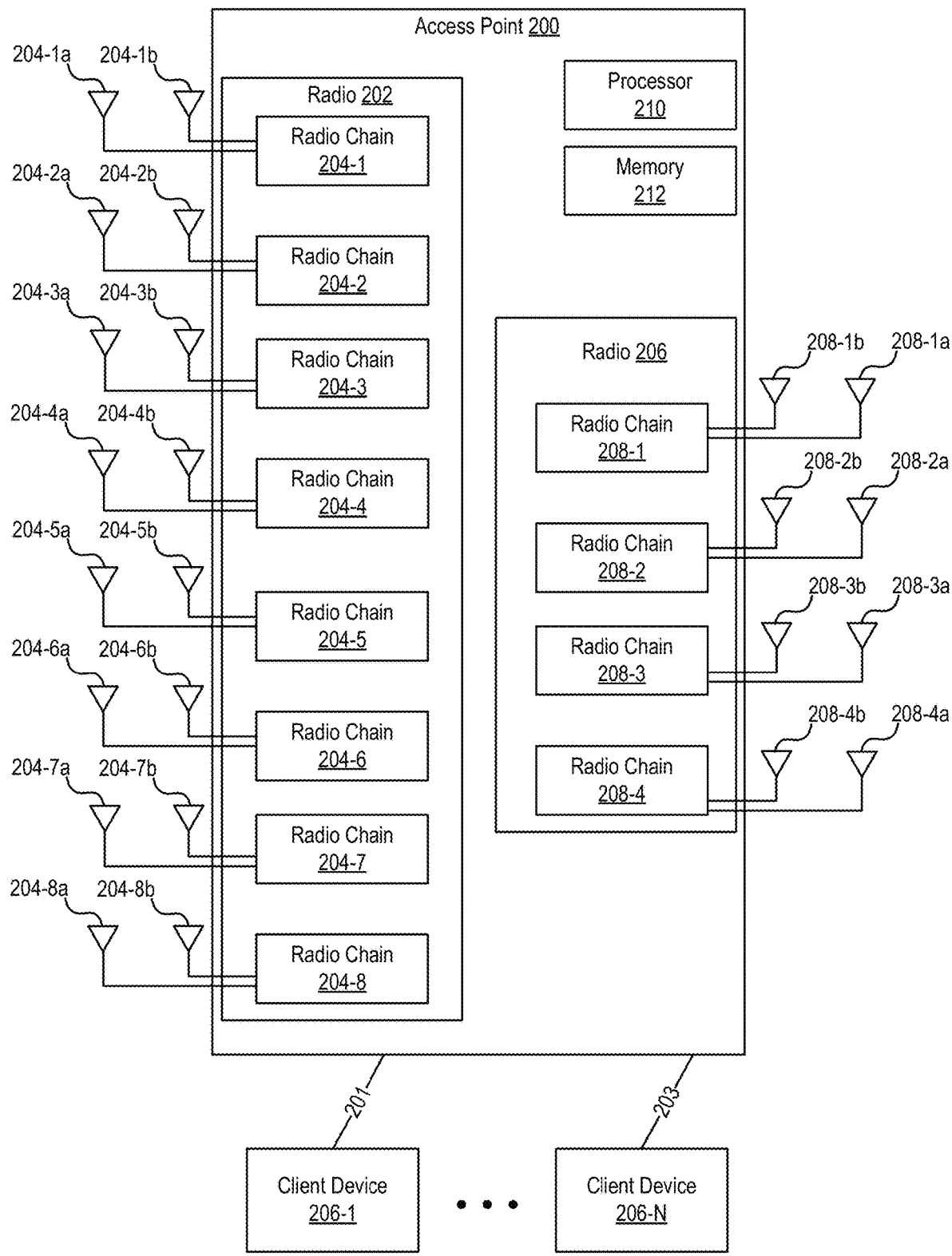
FIG. 2A illustrates an example access point within which various embodiments may be implemented.

FIG. 2A illustrates an example AP 200, which may be an embodiment of one of the APs of FIG. 1 (e.g., APs 106a-c). An AP can refer to a networking device that allows a wireless client device to connect to a wired or wireless network, and need not necessarily be limited to IEEE 802.11-based APs. An AP can include a processing resource, e.g., processor 210, a memory, e.g., memory 212, and/or input/output interfaces (not shown), including wired network interfaces such as IEEE 802.3 Ethernet interfaces, as well as wireless network interfaces such as IEEE 802.11 Wi-Fi® interfaces, although examples of the disclosure are not limited to such interfaces.

AP 200 can include a plurality of antennas. AP 200 can include a radio 202 which may be a 5 GHz radio including eight radio chains, 204-1, 204-2, 204-3, 204-4 . . . , 204-8. Each radio chain includes two antennas (204-1a, 204-1b, 204-2a, 204-2b, 204-3a, 204-3b, 204-4a, 204-4b . . . , 204-8a, 204-8b). For instance, each radio chain can include a horizontal antenna and a vertical antenna, among other possibilities. Each radio chain is available for both transmitting and receiving data. It should be understood that examples of the present disclosure are not so limited. AP 200 may further include another radio 206, which may be a 2.4 GHz radio including four radio chains, 208-1, 208-2, 208-3, 208-4. Similar to the radio chains 204-1 . . . 204-8, each of radio chains 208-1 . . . , 208-4 may include two (vertical and horizontal) antennas (208-1a, 208-1b . . . , 208-4a, 208-4b). Although not shown in FIG. 2A for clarity and so as not to obscure examples of the present disclosure, each of the radio chains can be connected to the plurality of antennas via a radio frequency (RF) switch.

Figure 2B:
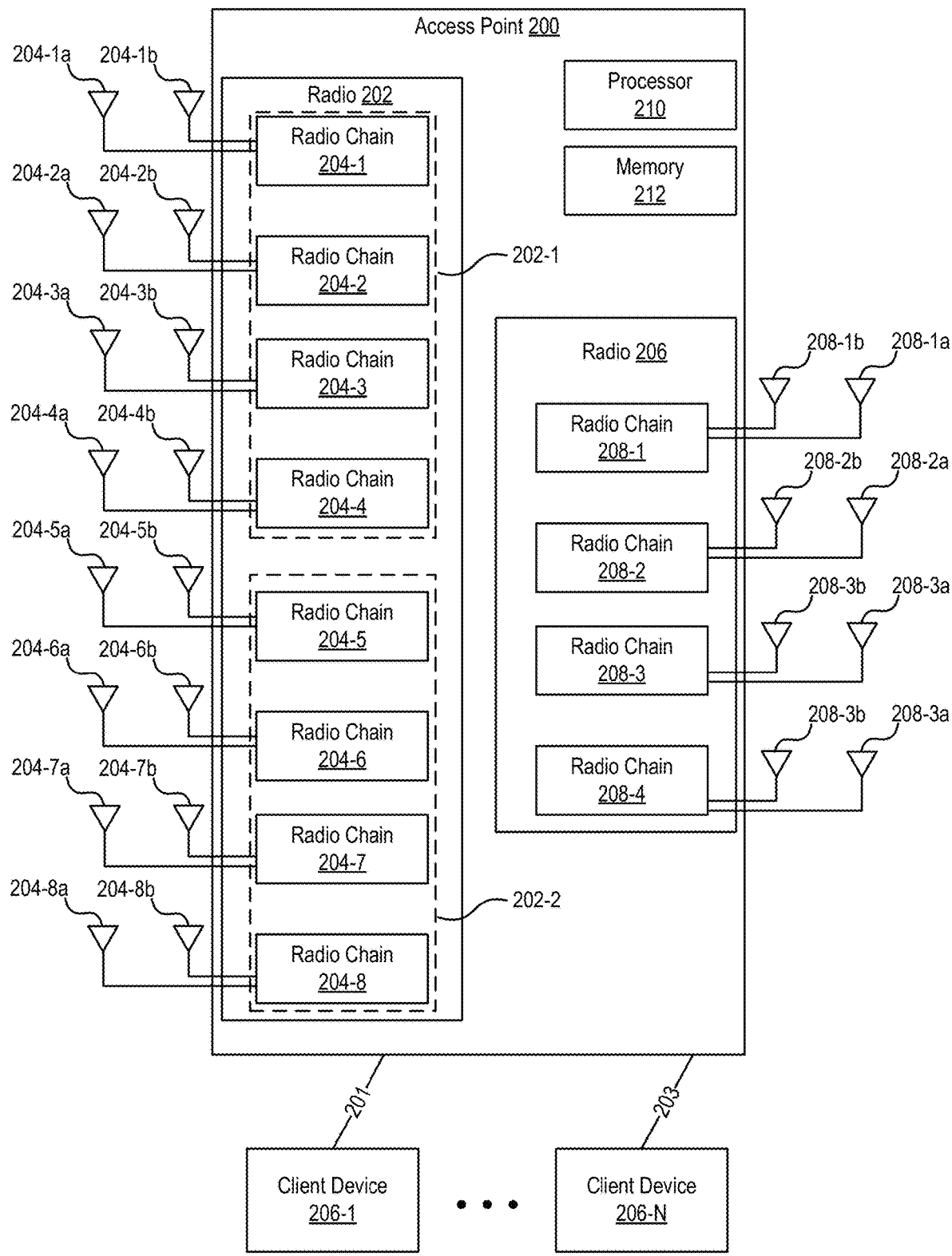
FIG. 2B illustrates a multi-radio configuration of the example access point of FIG. 2A.

In some examples, as illustrated in FIG. 2B, the eight radio chain 5 GHz radio, i.e., radio 202, may be converted at runtime, into two radios (202-1 and 202-2) operating simultaneously with four radio chains each (204-1 to 204-4, and 204-5 to 204-8). Thus, AP 200 may operate using simultaneous tri-radio operations, i.e., two 5 GHz radios (radio 202 partitioned into radios 202-1 and 202-2, and a single 2.4 GHz radio, i.e., radio 206). For example, radio 202-1 can be dedicated to a first communication channel 201 in a first communication channel group, and radio 202-2 can be dedicated to a second communication channel 203 in a second communication channel group.

In accordance with various embodiments, whether AP 200 is operating using radio 202 as a single radio or as two radios 202-1 and 202-2, one of the radio chains can be isolated and used for scanning on a different channel (as will be described in greater detail below). That is, AP 200 may operate in a 7+1 mode, where seven of the eight radio chains are used for BSS operations, and the remaining radio chain is used for scanning on a different channel. For example, radio chain 204-1 may be isolated and dedicated for scanning on a different channel, leaving radio chains 204-2, 204-3 . . . , 204-8 for use with BSS operations. Thus, AP 200 may be said to operate in a 7+1 mode. For example, radio chain 204-1 may be isolated and dedicated for scanning on a different channel. Thus, radio 202-1 can be used for BSS operations using radio chains 204-2, 204-3, and 204-4, and radio 202-2 can be used for BSS operations using radio chains 204-5, 204-6, 204-7, and 204-8. Thus, AP 200 may be said to operate in a 4+3+1 mode.

As mentioned, in some examples the communication band can be a 5.0 GHz UNII band. Communication channels (and mid-point frequencies) operating on the 5 GHz communication band can include 36 (5.180 GHz), 40 (5.200 GHz) 44 (5.220 GHz), and 149 (5.745 GHz), among others. In such examples, AP 200 can provide network connectivity to wireless client devices 206-1 on communication channel 201 (e.g., communication channel 36) included in a first communication channel group that is different from another communication channel 203 (e.g., communication channel 44) included in a second communication channel group that provides network connectivity to a different wireless client device such as wireless client device 206-N. That is, communication channel 201 is a communication channel that is different from communication channel 203. While illustrated as an individual communication channel it is understood that the first communication channel group and/or the second communication channel group can include a plurality of communication channels.

In some examples, the first communication channel group can include a plurality of communication channels with each communication channel of the plurality of communication channels is to operate on a communication band (e.g., 5.0 GHz UNII band) and operate in accordance with the particular wireless specification (e.g., 802.11ax). For example, by operating in accordance with the particular specification such as IEEE 802.11ax, each communication channel in the first communication channel group can employ OFDMA, spatial reuse, uplink multiuser multiple-input and multiple-output (UL MU-MIMO), and/or combinations thereof. By extension, a wireless client device having a capacity of complying with the particular wireless specification can, in such examples, have the capacity for employing OFDMA, spatial reuse, UL MU-MIMO, and/or combinations thereof.

It should be understood that in some network installations, the radio(s) of an AP, e.g., one of APs 1-6, 136, 146 (FIG. 1) or AP 200 (FIGS. 2A, 2B) may be configured to provide and maintain network connectivity over a first channel, referred to as its "home channel," with one or more client devices that are associated with the radio(s) and authenticated by the AP. Assignment of a home channel can be determined by a network-wide algorithm. At different prescribed times, an AP is configured to run in monitor mode to scan one or more other channels, referred to as its "foreign channels," to acquire state information from neighboring APs. An AP may attempt to sample channel utilization (derived from observed noise floor and interference on a channel) on all the channels that it has scanned. If the home-channel of a radio is a dynamic frequency scan (DFS) channel and detects a radar signal on it, the radio will transition to the best available channel based on its own analysis, without the intervention of the home channel assignment algorithm. This process will also be followed if the channel utilization on the current home-channel deteriorates beyond an acceptable level.

Thus, based on the above-described channel utilization sampling, a ranked list of channels to which a radio may migrate can be maintained by the AP (or controller). For example, such a ranked list may be stored and maintained in memory 212 of AP 200 (FIGS. 2A, 2B). This channel list may be updated in accordance with one or more regulatory updates that may impact the operation or use of certain channels, or may add (or remove) additional channels for use by client devices associated to an AP (such as one or more of client devices 206-1 to 206-N). For example, while AP 200, as illustrated in FIGS. 2A and 2B are capable of operating in the 5 GHz and 2.4 GHz ranges, a regulatory update may involve adding one or more channels in the 6 GHz range of the radio spectrum. That is, radio 202-2, for example, may be configurable to operate on channels within the 6 GHz range, e.g., channels 5 (5.975 GHz), 21 (6.055 GHz), 37 (6.135 GHz), etc. pursuant to a regulatory change or update. For example, the regulatory change/update may be a change/update allowing consumer use of the 6 GHz portion of the radio spectrum for wireless communications.

If a client device, e.g., client device 206-1, does not support any 6 GHz channels, it will not be able to find and communicate via any AP that has migrated to a 6 GHz channel. That is, if radio 202-2 of AP 200 migrates to a 6 GHz channel, radio 202-2 can begin transmitting beacons indicating its usage of a 6 GHz channel. If client device 206-1 cannot be updated/configured to operate on 6 GHz channels, when client device 206-1 attempts to scan for APs, it will not sense or discover radio 202-2 of AP 200. A failure to detect certain APs or radios of APs can result in a potential loss of coverage or service for client device 206-1 depending on what other APs or AP radios that client device 206-1 may be able to discover and leverage for its communication needs.

In accordance with some examples, a regulatory update may allow for new channels to be deployed as they become available for a given location, region, municipality, etc. However, examples of the disclosed technologies selectively distribute new channels (despite new/newer channels typically having less interference associated with their use). In some examples, new channels are deployed only when a large enough number of client devices (more than a given threshold, for example) in an ESS support the new channel(s). This can help ensure that if otherwise, valid channels, are not yet usable by enough client devices, such channels are not deployed until there are enough client devices that can use the new channels and benefit from use of the new channels. Additionally, backward or legacy regulatory compatibility at a particular location or region can be maintained for any client (old and already associated to the AP or new and attempting to associate to the AP).

FIG. 3 is a block diagram of an example computing component or device 300 for distributing channels pursuant to regulatory changes or updates in accordance with one example. Computing component 300 may be, for example, a server computer, a controller, or any other similar computing component capable of processing data. In the example implementation of FIG. 3, the computing component 300 includes a hardware processor, 302, and machine-readable storage medium, 304. In some embodiments, computing component 300 may be an embodiment of an AP processor or AP controller, e.g., processor 210 of AP 200, for example, or AP controller 104.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312. Memory 212 of AP 200 (or a memory of controller 104) may be an example of such a machine-readable storage medium.

Hardware processor 302 may execute instruction 306 to obtain a client-supported channel list. As noted above, a list of channels that may be used by an AP, i.e., an AP's radio(s) can be stored and maintained in memory, e.g., memory 212 of AP 200 (FIGS. 2A, 2B). This channel list may be updated in accordance with one or more regulatory updates that may impact the operation or use of certain channels, or may add (or remove) additional channels for use by client devices associated to an AP (such as one or more of client devices 206-1 to 206-N).

This client-supported channel list can act as a current baseline of channels that a particular client device can use for its communications needs. In some examples, this client-supported channel list can comprise all channels on which a client device has transmitted a probe request. That is, client devices typically perform channel scanning to determine if a suitable AP is available to which the client device may associate. During active scanning, a client device may transmit a probe request, and listens for a probe response from an AP. An AP or AP controller may obtain the client-supported channel list by recording information regarding the channels on which probe requests have been received by radios of an AP.

In some examples, the client-supported channel list can be obtained from "supported channels" data that is typically included in each association request sent by a client device to an AP (e.g., 802.11h-capable client devices). For client devices that are multi-band operation (MBO)-capable, preferred and non-preferred channel lists/data can provide the requisite client-supported channel list/provide information to create/maintain the client-supported channel list. In accordance with still other examples, a list of client-supported channels can be gleaned based on a client device's driver version, where certain driver versions may be associated with an ability to support the regulatory update. For example, software controlling communications on a client device or a client device's operating system (OS) may be versioned, and the client device manufacturer/vendor may indicate which software version supports which channel(s). It should be understood that the above mechanisms for obtaining a client device's client-supported channel list are examples, and not intended to be limiting in any way. Any method(s) or mechanism(s) of obtaining supported channels known now or in the future can be used. In some examples, some combination of methods/mechanisms for determining a client-supported channel list may be used.

At operation 308, the existence of a regulatory update impacting channel usage may be detected. As alluded to above, regulatory updates or changes can be promulgated throughout a network or deployment. In the case of APs, use of a downloadable regulatory table (DRT) feature allows a file containing/comprising regulatory updates to be pushed to APs (directly from a network management service, for example, or via a controller). Accordingly, when an AP receives a regulatory update file (or a regulatory update file is activated), such as the aforementioned Regulatory-Cert file, receipt can be indicative of detection of a regulatory update.

Each Regulatory-Cert file may include, for each AP, the name(s) of countries supported in the regulatory update, the allowed channels for each country, maximum effective isotropically radiated power (EIRP) for each channel and each country in the allowed list of channels. The maximum EIRP values are specified for each physical layer (PHY)-type on which the AP is allowed to transmit, as well as the DFS functionality for each channel/country making up the allowed list. When activated, a Regulatory-Cert file is compared to a default/current Regulatory-Cert file used by the AP to determine if the newly activated Regulatory-Cert file is a newer version of the default/current Regulatory-Cert file. If so, activation is completed. In the event the Regulatory-Cert file includes some change in channel list or power level, an AP would typically tune to the new channel(s)/change power level accordingly. The AP's channel list (AP-supported channel list) is also updated accordingly to include the new channel(s). It should be noted that in some examples, regulatory updates can be promulgated in various ways/using various mechanisms that may not necessitate use of an actual file. That is, and regardless of the mechanism(s) used, ultimately, allowed channel updates may be received or activated per one or more regulatory requirements.

At operation 310, the AP-supported channel list can be compared to client-supported channel lists corresponding to those client devices associated to that particular AP. If any differences exist, the AP determines which of the associated client devices do not/cannot support the changes in the, now-updated, AP-supported channel list. Those client devices that cannot support the changes can be categorized as "restricted channels clients" while the channels that a client can support can be referred to as a "restricted channels list." For example, if new channels are added by virtue of the regulatory update or change, some of the clients associated to an AP that has activated a newly received Regulatory-Cert file, may not be able to support/communicate over these new channels.

In some examples, as just described, the regulatory change of interest is the addition of new channels. Performing a comparison between the client-supported channel list(s) and the AP-supported channel list can comprise determining whether the AP-supported channel list is larger (in number) than the client-supported channel list. If so, the AP can make the determination that the client(s) associated with a client-supported channel list that is smaller than an AP-supported channel list are restricted channels clients. That is, the AP-supported channel list has more channels (due to the new channels added vis-à-vis the regulatory update or change).

At operation 312, channels of the AP-supported channel list are distributed among one or more radios of APs in a deployment based on AP density of the deployment and the determination regarding which clients do not support the channel usage changes. As alluded to above, distribution of channels amongst AP radios can be based on the channel capabilities of client devices associated to the AP, and the AP density. Again, client devices capable of supporting new channels and client devices incapable of supporting new channels may co-exist within the same network or deployment, or may be associated to the same or neighboring APs. Thus AP density is a network or deployment-wide characteristic to adjust/basis for adjusting channel distribution.

Accordingly, when the density of APs in a particular network or deployment is, e.g., middle of the road/approximately midway between minimum and maximum thresholds (neither too high nor too low), channels are distributed amongst the radios of APs in a manner that allows service to be provided to both types of client devices. In other words, distributing channels such that there are enough radios transmitting over both old and new channels (resulting from a regulatory update) allows coverage to be extended to both restricted channels clients and clients capable of supporting new channels.

If the density of APs is low (relative to a minimum threshold), however, only those channels existing prior to the regulatory update may be deployed. That is, because there is only a "small" number of APs able to service client devices in a particular network or deployment, if those APs, or even just some, are configured in accordance with a regulatory update to operate on one or more new channels, the restricted channels clients will experience significant service loss. While thresholds may vary, depending on the deployment, operational characteristics and circumstances, etc., an example of a minimum threshold may be, e.g., approximately −89 dBm.

If, on the other hand, the density of APs in a particular network or deployment is high (relative to a maximum threshold), both old and new channels are distributed as function of the number (or percentage) of client devices that cannot support the new channels, i.e., restricted channels clients. That is, enough APs have been deployed so that channels can be distributed in a way that is commensurate with the client device makeup of the network/deployment, i.e., channel distribution can be effectuated to accommodate the numbers of restricted channels clients and non-restricted channels clients. In this way, the operation of a network or AP deployments within one or more networks can be optimized in accordance with the client devices that exist/are operating in the network deployment. Again, while thresholds may vary, depending on the deployment, operational characteristics and circumstances, etc., an example of a maximum threshold may be, e.g., approximately −65 dBm.

Figure 4:
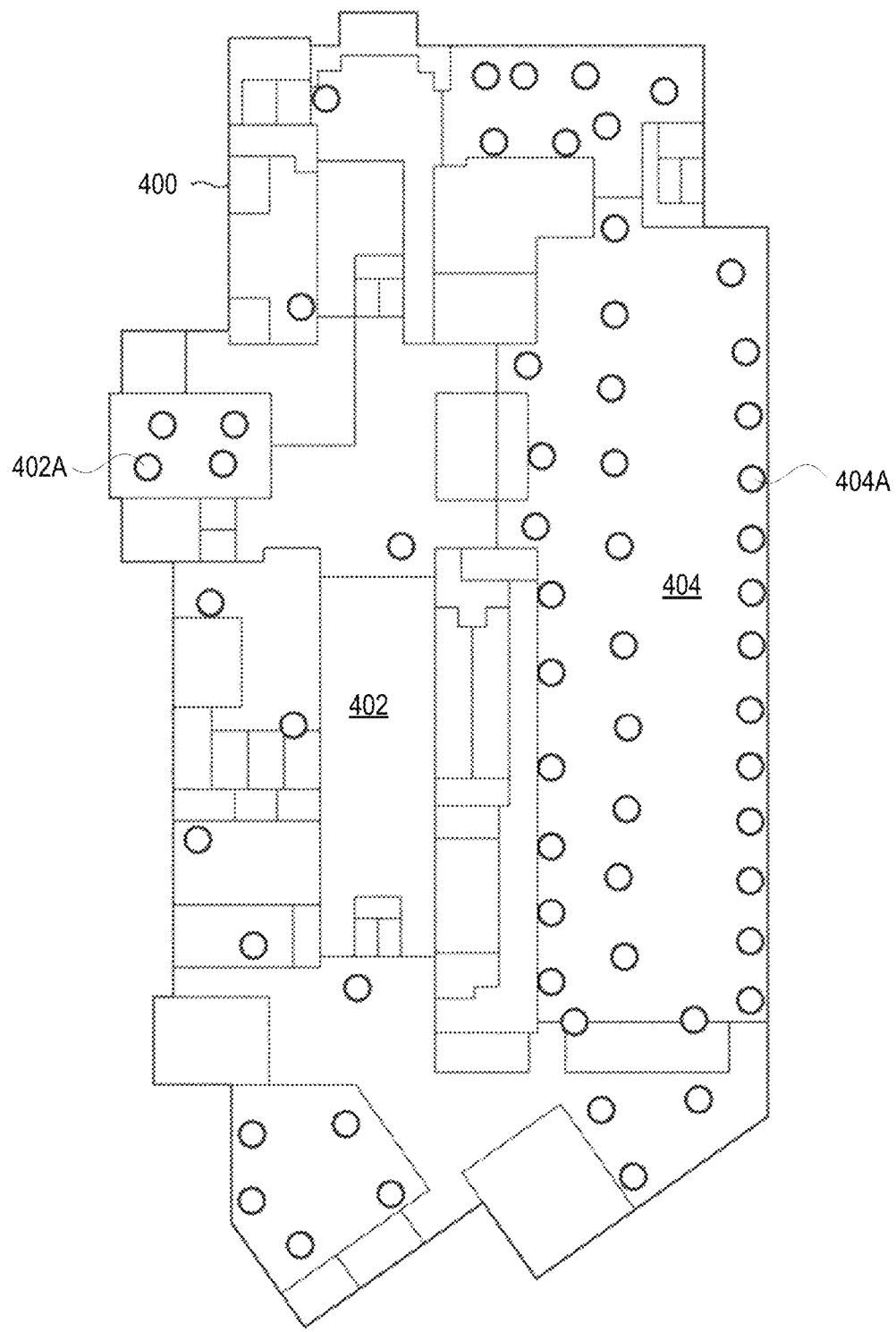
FIG. 4 illustrates an example deployment of access points.

FIG. 4A illustrates an example deployment 400 of APs in a building or other structure. To illustrate different densities, this example deployment may be considered to comprise two areas of differing AP density. In a first area 402 of deployment 400, it can be appreciated that the deployed APs (one example of which is labeled as AP 402A) corresponds to a "low" AP density deployment. It should be understood that the level of AP density considered to be low (or high or medium) can vary depending on factors such as the deployment environment, the number of client devices associated to each of the APs, transmit power of the APs. For example, one or two APs in a small area, e.g., the area (room) in which AP 402A has been deployed, may be considered to be high density. However, considering the entirety of the first area 402, AP density may be deemed to be low. In contrast, it can be appreciate that a second area 404 of deployment 400 can be considered to have a high AP density.

As discussed above, the term AP density can refer to a metric or characteristic that is indicative of the number of APs that are able to hear one another, e.g., can receive beacons or other signals transmitted by another AP, typically a neighboring AP. In the example of FIG. 4A, AP density can be appreciated vis-à-vis the distance or space between each of the APs. When AP density is high, typically, AP radio transmit power is lower/reduced relative to APs, e.g., in the first area 402, where the increase in distance between APs suggests a need for higher AP radio transmit power to provide coverage for client devices. Thus, in some examples, AP density can be measured in terms of pathloss between the APs. The lower the relative pathloss between APs, the denser the network or deployment. Other mechanisms or methods of determining AP density can be used, e.g., heat maps that represent the density of APs deployed in a particular area(s).

Therefore, in accordance with one example, being that the second area 404 of deployment 400 is considered to be high, upon an AP's channel list, e.g., the channel list of AP 404A, being updated pursuant to a regulatory change to include additional/new channels, the AP controller controlling the APs deployed in the second area 404 or the APs themselves, can determine client device capabilities as discussed above. Because the AP density is high in this second area 402, the APs or the AP controller(s) in the second area 402 may distribute channels amongst the radios of the APs based on the percentage of restricted channels client devices associated to those APs. That is, if the makeup of client devices operating in the second area 404 is such that 80% of the client devices are capable of operating over the newly added channels, and 20% of the client devices are restricted channels client devices, 20% of the AP radios can be assigned channels for use comprising old/currently-existing channels, e.g., channels in the 2.4 GHz and 5 GHz ranges, while 80% of the AP radios can be assigned channels for use comprising the newly added channels, e.g., channels in the 6 GHz range. It should be understood that the actual distribution of channels need not be exactly in line with the client device makeup percentages. It is noted that channel distribution may be accomplished using, e.g., a centrally run process which has an overall view of the various APs in a deployment, for example. Such a process can obtain/determine the requisite channel list(s), and can assign a channel to a particular AP/AP radio. It should be noted that such a channel assignment process can be similar to a configuration application, and may be run on an AP or AP controller as desired.

In contrast, consider the first area 402. Again, AP controller(s) controlling the APs, or the APs themselves may determine the channel capabilities of the client devices associated to those APs, e.g., AP 402A. Making this determination allows the AP controller(s) or APs to determine whether or not a regulatory change or upgrade includes the addition of new channels by comparing the upgraded AP channel list to the client device(s) channel list(s). In this way, a restricted channels list (described above) can be determined or derived. Assuming that the AP density of the first area 402 is considered to be low, only those channels in the restricted channels list are used across all the AP radios operating in the first area 402. In this way, the restricted channels client devices will continue receiving service via the APs of the first are 402.

In the event that either the first or second areas 402/404 is considered to be between the low and high AP density thresholds, channel distribution amongst the AP radios is performed such that the existing channels (of the restricted channels list) and the newly added channels are distributed equally. In other words, regardless of the client device channel capabilities, there are enough APs deployed to provide adequate service coverage for any client device. Compared to the previous scenario where AP density is high, allowing for more targeted channel distribution, this middle-of-the-road AP density still can prevent or mitigate coverage loss through equal distribution. That is, and considering a normal/typical AP density area, there will be a fair number of APs present and able to ensure coverage, so a coverage hole won't occur even when channels are equally distributed from restricted and "all-channel" (including new channels) lists. For example, with this type of channel distribution, a client device will have an AP to associate to nearby. In a case of heavy AP density, as described above, there may be more flexibility with channel distribution based on client device presence percentage because even if more AP radios are on newer channels, there are nevertheless more APs nearby to associate to. So we are just playing safe on normal density scenario. Accordingly, and for example, an deployment with high/heavy AP density, 80% distribution of new channels is possible, 50% distribution of new channels for medium AP density, and no new channels (0%) when AP density is low, as described above.

Figure 5:
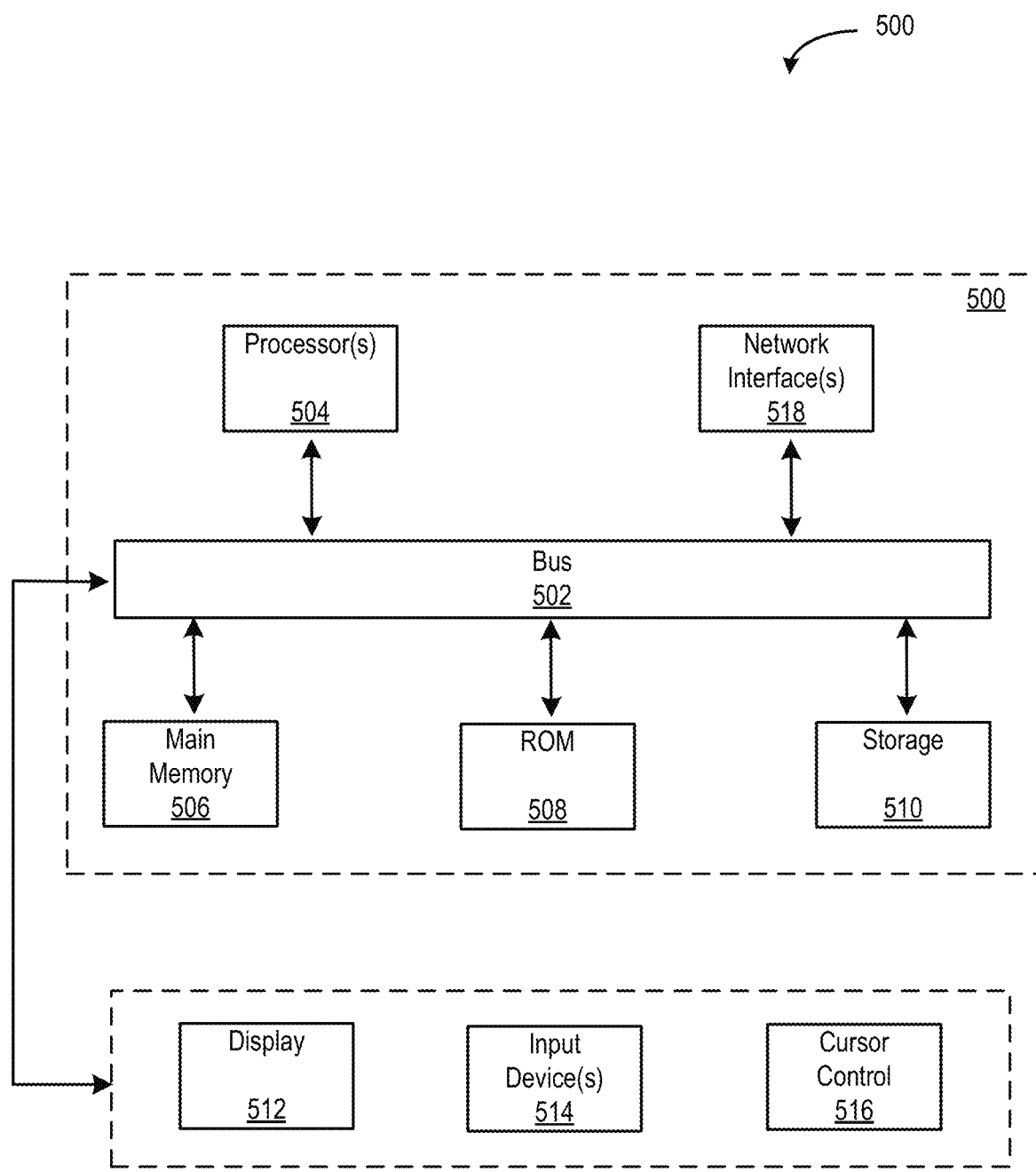
FIG. 5 depicts a block diagram of an example computer system in which various of the examples described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A network device, comprising:
a processor; and
a memory unit operatively connected to the processor, the memory unit including instructions that when executed, cause the processor to:
obtain a client-supported channel list;
detect existence of a regulatory update impacting channel usage in the network device;
compare an access point (AP)-supported channel list to the client-supported channel list, and determine which client devices associated to an AP do not support channel usage changes resulting from the regulatory update; and
control distribution of channels of the AP-supported channel list among one or more radios of APs in a deployment based on AP density of the deployment, and the determination regarding which client devices do not support the channel usage changes.

2. The network device of claim 1, comprising one of an AP or a controller.

3. The network device of claim 1, wherein the instructions that cause the processor to obtain the client-supported channel list, comprise instructions that further cause the processor to determine channels on which probe requests from the client devices are received by the one or more radios of the APs in the deployment, and correlate the determined channels to client-supported channels.

4. The network device of claim 1, wherein the instructions that cause the processor to obtain the client-supported channel list, comprise instructions that further cause the processor to determine channels included in association requests sent by the client devices to the one or more radios of the APs in the deployment, and correlate the determined channels to client-supported channels.

5. The network device of claim 1, wherein the instructions that cause the processor to obtain the client-supported channel list, comprise instructions that further cause the processor to determine client-supported channels based on communications-related software driver associated with the client devices.

6. The network device of claim 1, wherein the instructions that cause the processor to detect the existence of the regulatory update, comprise instructions that further cause the processor to at least one of receive or activate updates to allowed channels per a regulatory requirement.

7. The network device of claim 6, further comprising instructions that when executed, cause the processor to compare the updates to allowed channels to currently allowed channels.

8. The network device of claim 1, wherein the instructions that cause the processor to control distribution of the channels of the AP-supported channel list, comprises instructions that further cause the processor to distribute the channels equally among the one or more radios of APs in the deployment when the AP density falls approximately midway between minimum and maximum AP density thresholds, wherein AP density comprises a number of APs in a given area.

9. The network device of claim 1, wherein the instructions that cause the processor to control distribution of the channels of the AP-supported channel list, comprises instructions that further cause the processor to distribute only those channels of the AP-supported channel list that existed prior to the regulatory update among the one or more radios of APs in the deployment when the AP density is low relative to a minimum AP density threshold.

10. The network device of claim 1, wherein the instructions that cause the processor to control distribution of the channels of the AP-supported channel list, comprises instructions that further cause the processor to distribute all the channels of the AP-supported channel list commensurate with channel usage capabilities of the client devices when the AP density is high relative to a maximum AP density threshold.

11. A method, comprising:
obtaining, at one of an access point (AP) or controller controlling the AP, a client-supported channel list;
comparing an AP-supported channel list to the client-supported channel list;
determining which client devices associated to the AP do not support communications over one or more new channels; and
controlling distribution of channels of the AP-supported channel list among one or more radios of the AP and additional APs in a deployment based on AP density of the deployment, and the determination regarding which client devices do not support communications over the one or more new channels.

12. The method of claim 11, further comprising detecting the addition of the one or more new channels pursuant to receipt of an update to allowed channels.

13. The method of claim 11, wherein the controlling of the distribution of the channels of the AP-supported channel list, comprises distributing the channels equally among the one or more radios of the AP and the additional APs in the deployment when the AP density falls approximately midway between minimum and maximum AP density thresholds.

14. The method of claim 11, wherein the controlling of the distribution of the channels of the AP-supported channel list, comprises distributing only those channels of the AP-supported channel list that existed prior to the regulatory update among the one or more radios of the AP and the additional APs in the deployment when the AP density is low relative to a minimum AP density threshold.

15. The method of claim 11, wherein the controlling of the distribution of the channels of the AP-supported channel list, comprises distributing all the channels of the AP-supported channel list commensurate with channel usage capabilities of the client devices when the AP density is high relative to a maximum AP density threshold.

16. A method, comprising:
obtaining, at one of an access point (AP) or controller controlling the AP, a client-supported channel list;
comparing an AP-supported channel list to the client-supported channel list when the AP-supported channel list is updated pursuant to one or more channel usage changes;
determining which client devices associated to the AP do not support the one or more channel usage changes; and
controlling distribution of channels of the AP-supported channel list among one or more radios of the AP and additional APs in a deployment based on AP density of the deployment, and the determination regarding which client devices do not support the one or more channel usage changes.

17. The method of claim 16, further comprising determining the AP density of the deployment by measuring pathloss between the AP and the additional APs in the deployment.

18. The method of claim 16, wherein the controlling of the distribution of the channels of the AP-supported channel list, comprises distributing the channels equally among the one or more radios of the AP and the additional APs in the deployment when the AP density falls approximately midway between minimum and maximum AP density thresholds.

19. The method of claim 16, wherein the controlling of the distribution of the channels of the AP-supported channel list, comprises distributing only those channels of the AP-supported channel list that existed prior to the regulatory update among the one or more radios of the AP and the additional APs in the deployment when the AP density is low relative to a minimum AP density threshold.

20. The method of claim 16, wherein the controlling of the distribution of the channels of the AP-supported channel list, comprises distributing all the channels of the AP-supported channel list commensurate with channel usage capabilities of the client devices when the AP density is high relative to a maximum AP density threshold.

* * * * *